(12) United States Patent
Gilboy

(10) Patent No.: US 9,712,528 B2
(45) Date of Patent: *Jul. 18, 2017

(54) METHODS, SYSTEMS, AND PRODUCTS FOR AUTHENTICATION

(71) Applicant: AT&T Intellectual Property I, L.P., Atlanta, GA (US)

(72) Inventor: Christopher P. Gilboy, Freehold, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,337

(22) Filed: May 31, 2016

(65) Prior Publication Data

US 2016/0277402 A1    Sep. 22, 2016

Related U.S. Application Data

(63) Continuation of application No. 14/486,656, filed on Sep. 15, 2014, now Pat. No. 9,380,045, which is a continuation of application No. 11/949,452, filed on Dec. 3, 2007, now Pat. No. 8,839,386.

(51) Int. Cl.
| | |
|---|---|
| *H04L 29/06* | (2006.01) |
| *G06F 21/62* | (2013.01) |
| *H04W 4/14* | (2009.01) |
| *H04W 12/06* | (2009.01) |
| *H04W 12/08* | (2009.01) |

(52) U.S. Cl.
CPC ...... *H04L 63/0876* (2013.01); *G06F 21/6245* (2013.01); *H04L 63/08* (2013.01); *H04L 63/18* (2013.01); *H04W 4/14* (2013.01); *H04W 12/06* (2013.01); *H04W 12/08* (2013.01)

(58) Field of Classification Search
CPC ..... H04L 63/0876; H04L 63/08; H04L 63/18; H04W 12/08; H04W 4/14; H04W 12/06; G06F 21/6245

See application file for complete search history.

(56) References Cited

U.S. PATENT DOCUMENTS

| | | | | |
|---|---|---|---|---|
| 6,317,838 | B1 * | 11/2001 | Baize | H04L 63/029 380/244 |
| 6,704,789 | B1 * | 3/2004 | Ala-Laurila | H04L 29/12009 709/230 |
| 7,017,041 | B2 * | 3/2006 | Sandhu | H04L 9/14 380/30 |
| 7,281,137 | B1 * | 10/2007 | Vitikainen | H04L 63/08 380/250 |
| 7,287,270 | B2 * | 10/2007 | Kai | G06F 21/43 380/229 |

(Continued)

*Primary Examiner* — David Garcia Cervetti
(74) *Attorney, Agent, or Firm* — Scott P. Zimmerman, PLLC

(57) ABSTRACT

Multiple authentication procedures enhance security of Internet transactions. For example, a request is received from a customer to access a service. A first authentication request is sent to the customer for first authentication information. A second authentication request may be sent to the customer for second authentication information. The method then enables the customer to proceed with accessing the service if the second authentication information is received.

20 Claims, 4 Drawing Sheets

(56) References Cited

U.S. PATENT DOCUMENTS

| | | | | |
|---|---|---|---|---|
| 7,290,286 | B2* | 10/2007 | Moharram | H04L 63/0823 713/151 |
| 7,367,046 | B1* | 4/2008 | Sukiman | H04L 29/12216 709/219 |
| 7,373,515 | B2* | 5/2008 | Owen | G06F 21/31 713/182 |
| 7,546,276 | B2* | 6/2009 | Randle | G06F 21/31 705/65 |
| 7,765,580 | B2* | 7/2010 | Vandergeest | H04L 63/0823 726/2 |
| 7,870,599 | B2* | 1/2011 | Pemmaraju | G06F 21/32 340/5.8 |
| 8,151,322 | B2* | 4/2012 | Chen | H04W 12/06 726/27 |
| 8,166,524 | B2* | 4/2012 | Sentinelli | G06F 21/34 340/5.1 |
| 8,191,118 | B2* | 5/2012 | Kim | G06Q 20/40 726/4 |
| 8,296,562 | B2* | 10/2012 | Williams | H04L 63/0838 713/155 |
| 8,296,823 | B2* | 10/2012 | Schubert | H04L 63/0853 726/3 |
| 8,365,258 | B2* | 1/2013 | Dispensa | H04L 63/0869 705/64 |
| 8,434,133 | B2* | 4/2013 | Kulkarni | G06F 21/33 726/4 |
| 8,474,028 | B2* | 6/2013 | Kulkarni | H04L 63/08 380/229 |
| 8,484,698 | B2* | 7/2013 | Pemmaraju | G06F 21/32 726/2 |
| 8,533,791 | B2* | 9/2013 | Samuelsson | H04L 9/321 726/5 |
| 8,578,455 | B2* | 11/2013 | Esaka | H04L 63/08 726/5 |
| 8,839,386 | B2* | 9/2014 | Gilboy | H04L 63/08 726/7 |
| 9,047,473 | B2* | 6/2015 | Samuelsson | H04L 9/321 |
| 9,344,421 | B1* | 5/2016 | Chen | H04L 63/08 726/4 |
| 2002/0035690 | A1* | 3/2002 | Nakano | H04L 9/3271 713/171 |
| 2002/0078350 | A1* | 6/2002 | Sandhu | G06F 21/46 713/168 |
| 2002/0087858 | A1* | 7/2002 | Oliver | G06F 21/32 713/156 |
| 2002/0156906 | A1* | 10/2002 | Kadyk | H04L 63/0281 709/229 |
| 2002/0169988 | A1* | 11/2002 | Vandergeest | H04L 63/126 726/4 |
| 2003/0139910 | A1* | 7/2003 | Yamamoto | H04L 63/08 702/188 |
| 2003/0159034 | A1* | 8/2003 | Sato | H04L 63/0853 713/168 |
| 2003/0177353 | A1* | 9/2003 | Hiltgen | G06F 21/34 713/161 |
| 2003/0177392 | A1* | 9/2003 | Hiltgen | G06F 21/34 713/172 |
| 2003/0226037 | A1* | 12/2003 | Mak | H04L 12/66 726/10 |
| 2004/0010697 | A1* | 1/2004 | White | G06F 21/31 713/186 |
| 2004/0030935 | A1* | 2/2004 | Kai | G06F 21/43 726/5 |
| 2004/0059914 | A1* | 3/2004 | Karaoguz | G06Q 20/322 713/168 |
| 2004/0088543 | A1* | 5/2004 | Garg | H04L 63/0815 713/157 |
| 2004/0187009 | A1* | 9/2004 | Ebata | G06F 21/32 713/185 |
| 2004/0187018 | A1* | 9/2004 | Owen | G06F 21/31 713/184 |
| 2004/0250085 | A1* | 12/2004 | Tattan | G06F 21/32 713/186 |
| 2004/0255243 | A1* | 12/2004 | Vincent, III | G06F 17/2247 713/170 |
| 2005/0130659 | A1* | 6/2005 | Grech | H04L 63/08 455/436 |
| 2005/0234854 | A1* | 10/2005 | Jang | H04M 3/5175 |
| 2005/0251680 | A1* | 11/2005 | Brown | H04L 63/061 713/171 |
| 2005/0268107 | A1* | 12/2005 | Harris | G06F 21/31 713/182 |
| 2006/0041755 | A1* | 2/2006 | Pemmaraju | G06F 21/32 713/182 |
| 2006/0165226 | A1* | 7/2006 | Ernst | H04L 29/12103 379/114.01 |
| 2007/0042755 | A1* | 2/2007 | Singhal | G06F 21/313 455/411 |
| 2007/0136573 | A1* | 6/2007 | Steinberg | G06F 21/32 713/155 |
| 2007/0143831 | A1* | 6/2007 | Pearson | H04L 63/08 726/5 |
| 2007/0271598 | A1* | 11/2007 | Chen | H04W 12/06 726/4 |
| 2007/0294528 | A1* | 12/2007 | Shoji | G06F 21/10 713/159 |
| 2008/0004024 | A1* | 1/2008 | Puri | H04W 48/18 455/436 |
| 2008/0086764 | A1* | 4/2008 | Kulkarni | G06F 21/33 726/7 |
| 2008/0086767 | A1* | 4/2008 | Kulkarni | H04L 63/08 726/9 |
| 2008/0086770 | A1* | 4/2008 | Kulkarni | H04L 63/0876 726/20 |
| 2008/0092212 | A1* | 4/2008 | Patel | H04L 12/66 726/3 |
| 2008/0098464 | A1* | 4/2008 | Mizrah | G06F 21/36 726/5 |
| 2008/0098466 | A1* | 4/2008 | Yoshida | G06F 21/35 726/5 |
| 2008/0120711 | A1* | 5/2008 | Dispensa | H04L 63/0869 726/7 |
| 2008/0127320 | A1* | 5/2008 | De Lutiis | H04L 29/12216 726/9 |
| 2008/0141353 | A1* | 6/2008 | Brown | G10L 13/00 726/7 |
| 2008/0181197 | A1* | 7/2008 | Yin | H04L 12/66 370/352 |
| 2008/0250477 | A1* | 10/2008 | Samuelsson | H04L 9/321 726/4 |
| 2008/0281737 | A1* | 11/2008 | Fajardo | G06Q 40/00 705/35 |
| 2008/0282331 | A1* | 11/2008 | Teo | H04L 63/08 726/6 |
| 2008/0291900 | A1* | 11/2008 | Yin | H04L 12/66 370/352 |
| 2008/0295159 | A1* | 11/2008 | Sentinelli | G06F 21/34 726/6 |
| 2009/0037734 | A1* | 2/2009 | Kito | G06F 21/35 713/168 |
| 2009/0106138 | A1* | 4/2009 | Smith | G06Q 20/385 705/35 |
| 2009/0119754 | A1* | 5/2009 | Schubert | H04L 63/0853 726/4 |
| 2009/0239502 | A1* | 9/2009 | Dempo | H04L 12/4011 455/411 |
| 2009/0282467 | A1* | 11/2009 | Schenk | H04L 63/10 726/7 |
| 2009/0288159 | A1* | 11/2009 | Husemann | G09C 5/00 726/16 |
| 2009/0313681 | A1* | 12/2009 | Kim | G06Q 20/40 726/4 |
| 2009/0319797 | A1* | 12/2009 | Tornqvist | G06F 21/42 713/176 |
| 2010/0022233 | A1* | 1/2010 | Jung | H04M 3/42 455/419 |

(56) References Cited

U.S. PATENT DOCUMENTS

| | | | |
|---|---|---|---|
| 2010/0042838 A1* | 2/2010 | Ho | H04L 9/0844 713/169 |
| 2010/0049975 A1* | 2/2010 | Parno | H04L 63/08 713/168 |
| 2010/0135491 A1* | 6/2010 | Bhuyan | H04L 63/0869 380/247 |
| 2010/0274859 A1* | 10/2010 | Bucuk | H04L 63/08 709/206 |
| 2011/0004754 A1* | 1/2011 | Walker | H04L 9/3271 713/168 |
| 2011/0047605 A1* | 2/2011 | Sontag | G06F 21/32 726/7 |
| 2011/0067091 A1* | 3/2011 | Chavez | H04L 63/0823 726/5 |
| 2011/0207454 A1* | 8/2011 | Garg | H04M 3/42229 455/432.1 |
| 2012/0204236 A1* | 8/2012 | Chen | H04W 12/06 726/4 |
| 2012/0291112 A1* | 11/2012 | Sivaramakrishna Iyer | H04L 12/24 726/7 |
| 2013/0185775 A1* | 7/2013 | Dispensa | H04L 63/0869 726/4 |
| 2013/0347129 A1* | 12/2013 | Samuelsson | H04L 9/321 726/28 |
| 2014/0081863 A1* | 3/2014 | Balasubramanian | G06Q 20/04 705/44 |
| 2014/0109203 A1* | 4/2014 | Pemmaraju | G06F 21/32 726/5 |

* cited by examiner

METHODS, SYSTEMS, AND PRODUCTS FOR AUTHENTICATION

CROSS-REFERENCE TO RELATED APPLICATIONS

This application is a continuation of U.S. application Ser. No. 14/486,656 filed Sep. 15, 2014 and since issued as U.S. Pat. No. 9,380,045, which is a continuation of U.S. application Ser. No. 11/949,452 filed Dec. 3, 2007 and since issued as U.S. Pat. No. 8,839,386, with all applications incorporated herein by reference in their entireties.

The present invention relates generally to communication networks and, more particularly, to a method and apparatus for providing authentication over a network, e.g., an Internet Protocol (IP) network, a wireless network, etc.

BACKGROUND OF THE INVENTION

A customer may subscribe to a communications service with authentication. For example, a customer may subscribe to a Virtual Private Network (VPN) service that requires authentication of the users. For example, one method may require a user to provide a pre-configured password and/or identification when he/she attempts to access the service. However, if the user's pre-configured password and/or identification are compromised, then unauthorized users may gain access to the VPN service.

In another example, if the service being accessed is a point of sale request to purchase an item with a credit card and the pre-configured password and/or identification have been compromised, then an unauthorized user may commit a fraud using the compromised credit card. In addition, some vendors may not check signatures unless the transaction is above a specific amount, e.g., above $100, and so on. Unless the fraud or breach is detected quickly, the legitimate user may not realize that the credit card or his subscribed service has been compromised for a period of time.

SUMMARY OF THE INVENTION

In one embodiment, the present invention discloses a method and apparatus for providing authentication over a network, e.g., an Internet Protocol (IP) network, a wireless network, etc. For example, the method receives a request from a customer to access a service via a first user endpoint device, and sends a first authentication request to the customer for first authentication information. The method then sends a second authentication request to the customer for second authentication information via a second user endpoint device if the first authentication information is received, wherein the first user endpoint device is different from the second user endpoint device. The method then enables the customer to proceed with accessing the service if the second authentication information is received.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing authentication over a packet network, e.g., an Internet Protocol (IP) network, a wireless network, etc.

Figure 1:
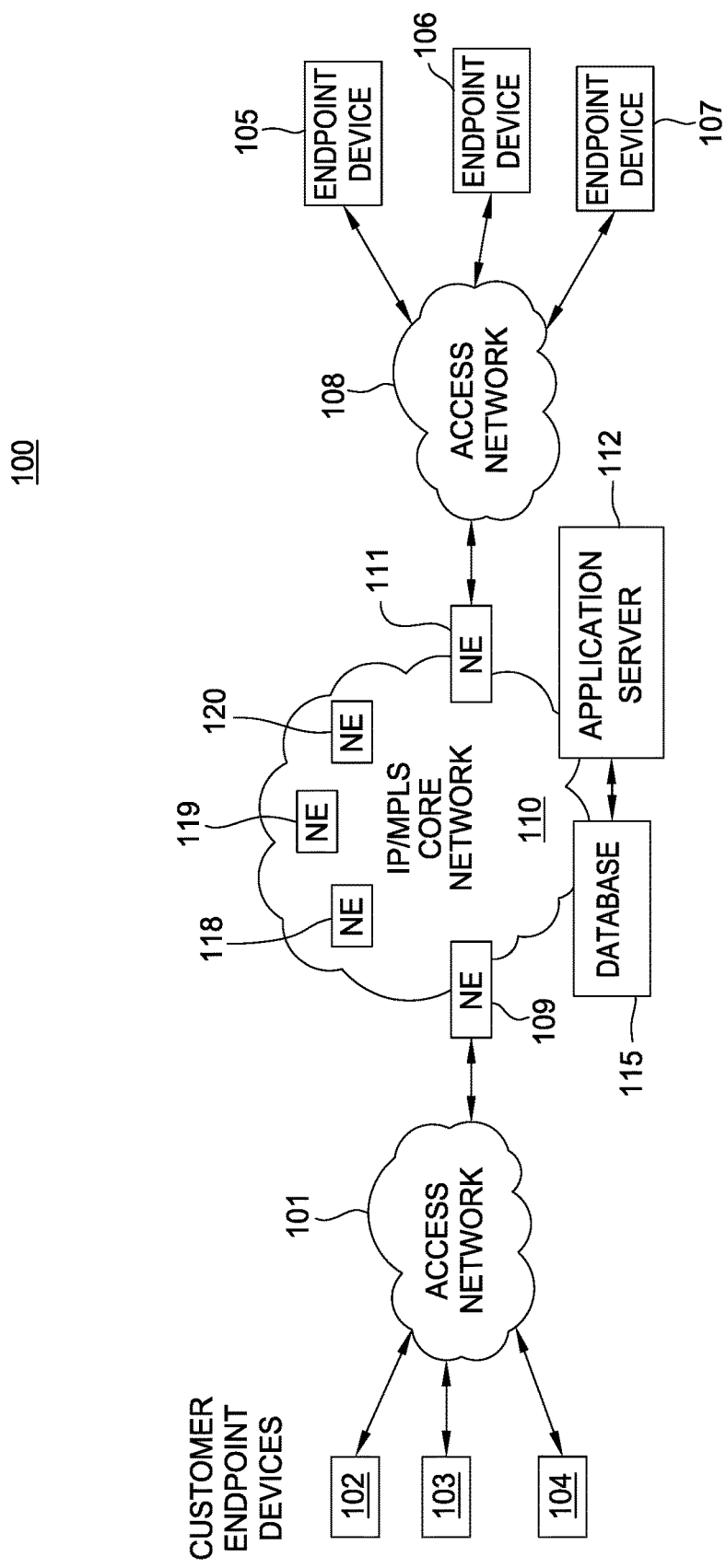
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that interacts with a database 115. The application server 112 may comprise any server or computer that is well known in the art, and the database 115 may be any type of electronic collection of data that is also well known in the art. Those skilled in the art will realize that although only six endpoint devices, two access networks, and five NEs are depicted in FIG. 1, the communication system 100 may be expanded by including additional endpoint devices, access networks, border elements, etc. without altering the present invention.

It should be noted that the above IP network is described only to provide an illustrative environment in which packets for voice and data services are transmitted on networks. A customer may subscribe to a communications service from a network service provider. However, if the customer's endpoint device and/or the customer's authentication information are compromised, then unauthorized users may gain access to the service.

In one embodiment, the present invention discloses a method and apparatus for providing authentication. Specifically, the method establishes two diverse communications paths for authenticating the user. Thus, when a customer subscribes to a service having an authentication requirement, the network service provider may prompt the customer to select two distinct methods for authentication before the customer is allowed to access the service. For example, a network service provider may request a subscriber who is accessing service via a first endpoint device (e.g., a computer) to provide a second endpoint device (e.g., a portable endpoint device, e.g. a cellular phone, PDA, pager, etc.) where a second authentication message may be sent.

To illustrate, when the customer requests to access a service with an authentication requirement, the method may prompt the customer for a first authentication information. For example, the method may prompt for an Identification and/or password, PIN number, etc. If a valid response is received for the first authentication request, then the method may retrieve the user-defined information for the second authentication. More specifically, the method will determine the type of authentication and/or user endpoint device selected by the customer for the second authentication. For example, the customer may have selected a cellular telephone, a pager, a PDA, etc. as the user endpoint device for implementing the second authentication. As such, as part of the subscription procedure, the customer would have defined the second endpoint device type and the manner in which the second endpoint device can be reached, e.g., a phone number, an email address, and so on.

The method may then continue with the authentication procedure by launching an authentication request for the second authentication. For the example above, the method may send an authentication request to the customer's cellular telephone. Again, the method may prompt for an Identification and/or password, PIN number, etc. If a valid response is received for the second authentication request, the method then enables the customer to proceed with accessing the service.

For example, if the service being accessed is a point of sale transaction using a credit card, then the customer may choose a message, e.g., a text message, to be sent to his/her cellular phone for the second authentication before the point of sale transaction is accepted. Responding to the second authentication request may require a response via the second user endpoint device as defined by the customer. The response can be a password or pin that is only known by the customer. For example, a customer may have to enter a code that is difficult to guess (e.g., a password previously chosen by the customer) via a wireless endpoint device prior to being allowed to proceed with accessing service. The code may be setup when the service was initially configured.

Alternatively, a customer may simply indicate a confirmation (e.g., a yes response) by pressing a specific key or a denial (e.g., a no response) by pressing another key to indicate that he is or is not executing a sale transaction. This second approach minimizes the need for the customer having to remember a second set of authentication information. The fact that the customer is responding to a simple question interactively at a current time via the second endpoint device may be sufficient to indicate that the request for service is legitimate. Thus, stealing a customer's sign-on identification and password or even the customer's physical access card (e.g., a credit card) alone will not be sufficient for an unauthorized user to gain access to the subscribed service.

Figure 2:
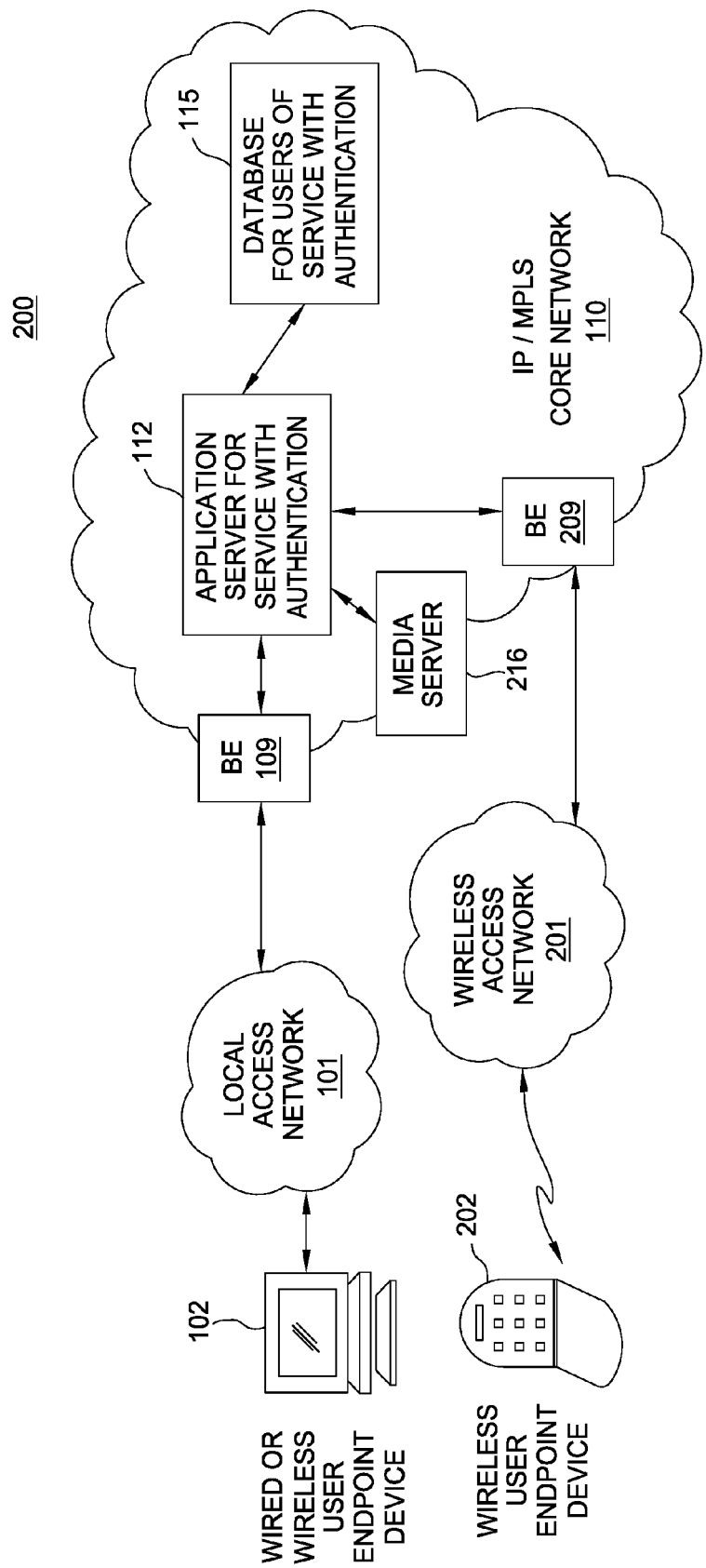
FIG. 2 illustrates an exemplary network with authentication.

FIG. 2 illustrates an exemplary network 200 for implementing the authentication method of the present invention. The illustrative network 200 comprises a wired or wireless user endpoint device 102, a wireless user endpoint device 202, an access network 101 such as a cable or DSL broadband access network, a wireless access network 201, and an IP/MPLS core network 110. In one embodiment, the IP/MPLS core network 110 comprises a plurality of border elements 109 and 209, an application server 112 for one or more services with authentication, a media server 216, and a database for services with authentication 115.

The user endpoint device 102 is able to communicate with the IP/MPLS core network 110 through the local access network 101 and border element 109. The wireless user endpoint device 202 is able to communicate with the IP/MPLS core network 110 through the wireless access network 201 and border element 209.

In one embodiment, the application server 112 may utilize the media server 216 for communicating with user endpoint devices 102 and 202 in a format compatible with the user endpoint device. For example, one user endpoint device may be able to process information in both graphics and text format while another user endpoint device may only process information in text format. In another example, the media server 216 may be used to provide a web page interface to the user, e.g., a Hyper-Text Markup Language (HTML) page and the like.

For example, a customer may utilize the user endpoint device 102 to communicate with application server 112 for subscribing to a service with authentication (e.g., requiring an authentication procedure to be completed in order to gain access to the subscribed service). Generally, the authentication procedure will require that a first authentication method or step be fulfilled by the customer. The format and/or communication channel of such first authentication method is often dictated by the service provider and cannot be altered by the customer. For example, the service provider may require that a customer accesses a particular URL and then provide the proper log-on user name and password. Although the customer may define the characters to be used for the log-on user name and the password, this first authentication method or step does not allow the customer to define the format and/or communication channel to be used.

In turn, the application server 112 will prompt the customer to select a second method of authentication, i.e., to provide a second user endpoint device and/or the format to be used with the second user endpoint device. It should be noted that this second authenticated method or step is user-definable. For example, the customer may choose to receive an Instant Massage (IM) at the wireless user endpoint device 202, as a second method of authentication. The application server 112 may then store the selected second method of authentication (e.g., receiving an IM message, receiving a telephone call, and the like) and endpoint device information (e.g., the type of user endpoint device) at the database 115. For example, the database 115 may contain a list of customers. For each customer, the database will store a selected second authentication format (IM, phone call, etc.), a selected endpoint device type and associated contact information, e.g., a wireless phone number, an email address, and so on.

Once the authentication parameters have been defined, when the customer at a later session requests to access the service, the application server 112 will prompt the customer for the first authentication information such as a password and/or a PIN to be entered via the user endpoint device 102. If a valid response (password and/or PIN) is received from the user endpoint device 102, the method may then retrieve the information for the second authentication from the database 115. The method then generates a second authentication request for the second authentication. For the example above, the method will send a second authentication request to the wireless user endpoint device 202. If a valid response is received from the customer for the second authentication request via the wireless endpoint device 202, then the method enables the customer to proceed with accessing the service via the user endpoint device 102.

It should be noted that in one embodiment, the second authentication method is implemented using a different endpoint device (broadly a second user endpoint device) from the endpoint device (broadly a first user endpoint device) that was used in responding to the first authentication request. Furthermore, in one embodiment, the second authentication method is implemented automatically without the interaction of a live agent.

In yet another alternate embodiment, the second authentication request may be received via the second user endpoint device, but a response to the second authentication request may be provided via the first user endpoint device. For example, the second authentication request may simply be a string of arbitrarily chosen characters (e.g., alphanumeric characters, symbols, and the like) that is provided to the second user endpoint device. Upon receipt of the string of characters in real time, the customer may simply enter the received string of characters via the first user endpoint device, where it is presented back to the service provider. In other words, the second authentication request may contain information to be used for continuing to access the service. The customer simply reads the provided string of characters, enters the string of characters via the first user endpoint device (e.g., a computer, a keypad for a point of sale transaction, etc.), and proceeds with the transaction. This approach will indicate to the service provider that the customer is currently in possession of the second user endpoint device and that the customer is able to use the received information to fulfill the requirement of the second authentication method.

Figure 3:
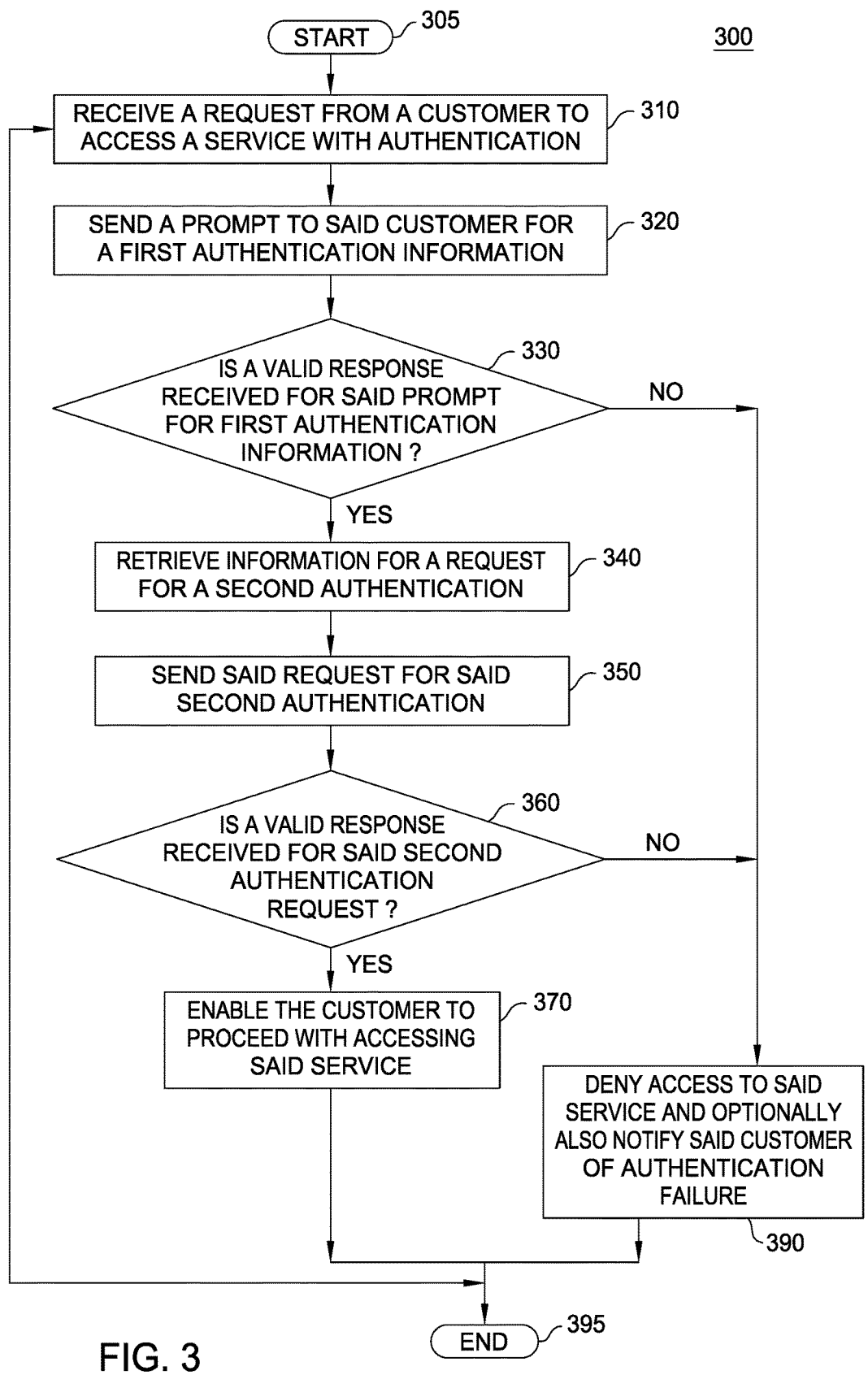
FIG. 3 illustrates a flowchart of a method for providing authentication.

FIG. 3 illustrates a flowchart of a method 300 for providing authentication. Method 300 starts in step 305 and proceeds to step 310.

In step 310, method 300 receives a request from a customer to access a service with authentication. For example, an application server for a service receives a request from a first user endpoint device to access a service with authentication.

In step 320, method 300 sends a prompt (e.g., a first authentication request) to the customer to provide a proper authentication response (e.g., first authentication information). For example, the method sends a request to the customer to provide one or more of: a user name, a password, an Identification (ID), a Personal Identification Number (PIN), etc.

In step 330, method 300 determines whether a valid response is received for the prompt for first authentication information. For example, the method determines whether a valid user name, a valid password, a valid identification, and/or a valid PIN, has been received. If a valid response is received for the prompt for first authentication information, the method proceeds to step 340. Otherwise, the method proceeds to step 390.

In step 340, method 300 retrieves information for generating a request for a second authentication. For example, the method retrieves the format of the second authentication, the second user endpoint device type, and the contact information (e.g., telephone number, email address, etc.) to reach the second user endpoint device.

In step 350, method 300 sends a second authentication request for the second authentication. For example, the method may send a prompt to the customer's wireless user endpoint device requesting the customer to indicate whether or not he/she has requested to access the service. For example, a second authentication request may simply ask the customer to enter "y" for yes or "n" for no to a question "Did you initiate the request to access the service?"

In step 360, the method determines whether a valid response is received for the second authentication request. If a valid response (confirmation) is received from the customer for the second authentication request, the method proceeds to step 370. Otherwise, the method proceeds to step 390.

In step 370, method 300 enables the customer to proceed with accessing the service. For example, if the customer confirms that he/she is the one requesting to access the service, then the method allows the customer to proceed with accessing the service. The method then proceeds to step 395 to end processing the current request and to step 310 to continue receiving requests for service.

In step 390, method 300 denies access to the service and optionally also notifies the customer of the authentication failure. The notification may assist the customer in quickly realizing that an unsuccessful attempt was made to access the customer's subscribed service. The method then proceeds to step 395 to end processing the current request or returns to step 310 to continue receiving requests for service.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
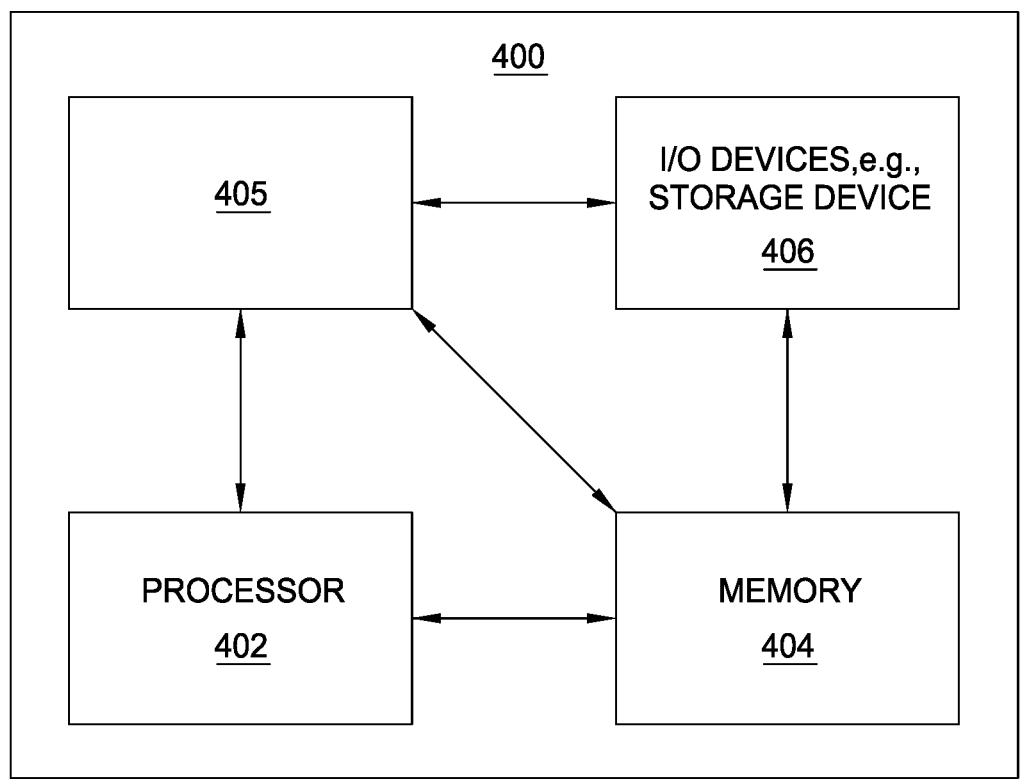
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing authentication, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing authentication can be loaded into memory 404 and executed by processor 402 to implement the functions as discussed above. As such, the present method 405 for providing authentication (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method, comprising:
   receiving, by a server, an electronic transaction, the electronic transaction associated with a network address;
   querying, by the server, an electronic database for the network address associated with the electronic transaction, the electronic database electronically associating authentication procedures and network addresses including the network address associated with the electronic transaction;
   identifying, by the server, two authentication procedures from the electronic database that are electronically associated with the network address, a first authentication procedure of the two authentication procedures specifying a first network, and a second authentication procedure of the two authentication procedures specifying a second network;
   sending, by the server, a first authentication request via the first network to a device associated with the network address, the first authentication request associated with the first authentication procedure;
   sending, by the server, a second authentication request via the second network to the device associated with the network address, the second authentication request associated with the second authentication procedure; and
   authenticating, by the server, the electronic transaction in response to a verification of the second authentication procedure.

2. The method of claim 1, further comprising receiving a credit card number associated with the electronic transaction.

3. The method of claim 1, further comprising initiating a text message to a cellular telephone number.

4. The method of claim 1, further comprising sending a text message to a cellular telephone number.

5. The method of claim 1, further comprising sending a text message via a cellular network as the second network, the text message sent to a cellular telephone number associated with the device.

6. The method of claim 1, further comprising receiving a response associated with the first authentication request sent via the first network.

7. The method of claim 1, further comprising receiving a response associated with the second authentication request sent via the second network.

8. A system, comprising:
   a processor; and
   a memory device, the memory device storing code, the code when executed causing the processor to perform operations, the operations comprising:
   receiving a request associated with a transaction, the transaction associated with a device, the device associated with a network address;
   querying an electronic database for the network address associated with the device, the electronic database electronically associating authentication procedures and network addresses including the network address associated with the device;
   identifying two authentication procedures from the electronic database that are electronically associated with the network address, a first authentication procedure of the two authentication procedures specifying a first network, and a second authentication procedure of the two authentication procedures specifying a second network;
   sending a first authentication request via the first network to the device, the first authentication request associated with the first authentication procedure;
   sending a second authentication request via the second network to the device, the second authentication request associated with the second authentication procedure; and
   authenticating the transaction in response to a verification of the second authentication procedure.

9. The system of claim 8, wherein the operations further comprise receiving a credit card number associated with the transaction.

10. The system of claim 8, wherein the operations further comprise initiating a text message to a cellular telephone number associated with the device.

11. The system of claim 8, wherein the operations further comprise sending a text message to a cellular telephone number associated with the device.

12. The system of claim 8, wherein the operations further comprise sending a text message via a cellular network as the second network, the text message sent to a cellular telephone number associated with the device.

13. The system of claim 8, wherein the operations further comprise receiving a response associated with the first authentication request sent via the first network.

14. The system of claim 8, wherein the operations further comprise receiving a response associated with the second authentication request sent via the second network.

15. A memory device storing instructions that when executed cause a processor to perform operations, the operations comprising:
   receiving a request associated with a transaction, the transaction associated with a device, the device associated with a network address;
   querying an electronic database for the network address associated with the device, the electronic database electronically associating authentication procedures and network addresses including the network address associated with the device;
   identifying two authentication procedures in the electronic database that are electronically associated with the network address, a first authentication procedure of the two authentication procedures specifying a first network, and a second authentication procedure of the two authentication procedures specifying a second network;
   sending a first authentication request via the first network to the device, the first authentication request associated with the first authentication procedure;
   sending a second authentication request via the second network to the device, the second authentication request associated with the second authentication procedure; and
   authenticating the transaction in response to a verification of the second authentication procedure.

16. The memory device of claim 15, wherein the operations further comprise receiving a credit card number associated with the transaction.

17. The memory device of claim 15, wherein the operations further comprise initiating a text message to a cellular telephone number associated with the device.

18. The memory device of claim 15, wherein the operations further comprise sending a text message to a cellular telephone number associated with the device.

19. The memory device of claim 15, wherein the operations further comprise sending a text message via a cellular network as the second network, the text message sent to a cellular telephone number associated with the device.

20. The memory device of claim 15, wherein the operations further comprise receiving a response associated with the second authentication request sent via the second network.

\* \* \* \* \*